(12) United States Patent
Ryu et al.

(10) Patent No.: US 8,947,458 B2
(45) Date of Patent: Feb. 3, 2015

(54) METHOD FOR PROVIDING INFORMATION ON OBJECT WITHIN VIEW OF TERMINAL DEVICE, TERMINAL DEVICE FOR SAME AND COMPUTER-READABLE RECORDING MEDIUM

(75) Inventors: Jung Hee Ryu, Seoul (KR); Kyoung Suk Lee, Seoul (KR)

(73) Assignee: Intel Corporation, Santa Clara, CA (US)

( * ) Notice: Subject to any disclaimer, the term of this patent is extended or adjusted under 35 U.S.C. 154(b) by 249 days.

(21) Appl. No.: 13/378,362

(22) PCT Filed: Jan. 27, 2011

(86) PCT No.: PCT/KR2011/000560
§ 371 (c)(1),
(2), (4) Date: Dec. 15, 2011

(87) PCT Pub. No.: WO2011/096668
PCT Pub. Date: Aug. 11, 2011

(65) Prior Publication Data
US 2012/0092372 A1    Apr. 19, 2012

(30) Foreign Application Priority Data
Feb. 5, 2010 (KR) .................. 10-2010-0011212

(51) Int. Cl.
*G09G 5/00* (2006.01)
*G06T 19/00* (2011.01)
(Continued)

(52) U.S. Cl.
CPC .......... *G06T 19/006* (2013.01); *G01C 21/3602* (2013.01); *G01C 21/3682* (2013.01); *G09B 5/125* (2013.01)
USPC .......................................... 345/636; 345/633

(58) Field of Classification Search
USPC .................................. 345/636, 633
See application file for complete search history.

(56) References Cited

U.S. PATENT DOCUMENTS

| 2003/0160867 A1* | 8/2003 | Ohto et al. .................... 348/135 |
| 2007/0162942 A1 | 7/2007 | Hamynen et al. |

(Continued)

FOREIGN PATENT DOCUMENTS

| JP | 09-281889 | 10/1997 |
| JP | 2002027529 | 1/2002 |

(Continued)

OTHER PUBLICATIONS

JP Office Action for Application No. 2012-551087; Jun. 3, 2013, 9 pages.

*Primary Examiner* — Xiao Wu
*Assistant Examiner* — Yingchun He
(74) *Attorney, Agent, or Firm* — Blakely, Sokoloff, Taylor & Zafman LLP

(57) ABSTRACT

The present invention relates to a method for providing information on an object included in a visual field of a terminal in a form of augmented reality (AR) by using an image inputted to the terminal and its relating information. The method includes the steps of: (a) specifying the visual field of the terminal corresponding to the inputted image by referring to at least one piece of information on a location, a displacement and a viewing angle of the terminal; and (b) acquiring a graphic element corresponding to the object, included in the visual field of the terminal, whose identity is recognized by using a technology for matching a building image and displaying the acquired graphic element with the inputted image in the form of the augmented reality by providing the graphic element on a location of the object displayed on a screen of the terminal.

5 Claims, 3 Drawing Sheets

(51) Int. Cl.
*G01C 21/36* (2006.01)
*G09B 5/12* (2006.01)

(56) References Cited

U.S. PATENT DOCUMENTS

| | | | |
|---|---|---|---|
| 2009/0061901 A1* | 3/2009 | Arrasvuori et al. | 455/456.3 |
| 2010/0309225 A1* | 12/2010 | Gray et al. | 345/633 |
| 2011/0052042 A1* | 3/2011 | Ben Tzvi | 382/154 |
| 2011/0109747 A1* | 5/2011 | Forrester et al. | 348/152 |
| 2011/0135207 A1* | 6/2011 | Flynn et al. | 382/209 |

FOREIGN PATENT DOCUMENTS

| | | |
|---|---|---|
| JP | 2003283664 | 10/2003 |
| JP | 2004-077189 | 3/2004 |
| JP | 2009088903 | 4/2009 |
| KR | 1020030054603 A | 7/2003 |
| KR | 1020050055506 A | 6/2005 |
| KR | 1020080084859 A | 9/2008 |
| KR | 100976138 B1 | 8/2010 |

* cited by examiner

METHOD FOR PROVIDING INFORMATION ON OBJECT WITHIN VIEW OF TERMINAL DEVICE, TERMINAL DEVICE FOR SAME AND COMPUTER-READABLE RECORDING MEDIUM

CROSS REFERENCE TO RELATED APPLICATIONS

This application is a U.S. National Phase Application of International Application PCT Application No. PCT/KR2011/000560 filed on Jan. 27, 2011, which claims the benefit of priority from Korean Patent Application No. 10-2010-0011212 filed on Feb. 5, 2010. The disclosures of International Application PCT Application No. PCT/KR2011/000560 and Korean Patent Application No. 10-2010-0011212 are incorporated herein by reference.

FIELD OF THE INVENTION

The present invention relates to a method, a terminal and a computer-readable recording medium for providing information on an object included in a visual field of a terminal; and more particularly, to the method, the terminal and the computer-readable recording medium for allowing a user to interestingly recognize the object included in the visual field of the terminal and effectively obtain information on the object by displaying an graphic element corresponding to the object included in the visual field of the terminal with an image inputted through the terminal in a form of an augmented reality (AR).

BACKGROUND OF THE INVENTION

Recently, due to the wide spread use of the Internet, it has been common to provide geographical information converted to a digital form which was once offered in a form of printing such as books. A digital map service provided online, a navigation system installed in a vehicle, etc. may be examples. As such, one of benefits of the digitalized geographic information is to provide a variety of convenient functions for users through user interfaces capable of allowing the users to retrieve desired geographic information. Further, changes in the geographic information may be easily updated through remote updating services, etc., so that, in the aspect of latest geographic information, such digital data may be predominant over conventional printed materials.

In special, a technology of providing geographical information in a form of augmented reality (AR) which displays supplementary information, including computer graphics (CG), texts, etc., combined on an inputted image taken in real time by a terminal has been recently introduced. According to the AR technology, the technology may provide the geographical information for the user in a more intuitive method because it may offer supplementary information (e.g., a graphic element indicating a point of interest (POI), etc.) which overlaps visually with an inputted image, i.e., an image of the real world the user is watching as being inputted through a camera module of the terminal.

But it was general to simply display a name of an object in a form of string if supplementary information on the object included in a visual field of a terminal is provided by using the conventional augmented reality technology.

However, according to the conventional augmented reality technology, since an object that a user wants to search must be distinguished only by a string, etc., the discrimination among respective objects is not visually and expressly revealed. Further, since it is general that a size of a display equipped in a mobile terminal (e.g., a liquid crystal display, etc.) is not big enough to display a great amount of information, if multiple objects are included in a visual field of the terminal, visibility becomes poor due to a reduced size of the string and rates of misreading increase.

Accordingly, the applicant of the present invention came to develop a technology which supports the user to rapidly recognize an object included in the visual field of the terminal and accurately obtain information on the object by displaying graphic elements such as a brand, a logo, etc. of the object included in the visual field thereof with an inputted image to increase a degree of distinguishment of objects included in the visual field of the terminal from the viewpoint of the user.

SUMMARY OF THE INVENTION

It is, therefore, an object of the present invention to solve all the problems mentioned above.

It is another object of the present invention to specify a visual field of a terminal corresponding to an inputted image entered thereto by referring to information on the location, displacement and viewing angle thereof and provide graphic elements corresponding to an object included in the visual field thereof at a location of the object displayed on the screen thereof in a form of augmented reality.

In accordance with one aspect of the present invention, there is provided a method for providing information on an object included in a visual field of a terminal in a form of augmented reality (AR) by using an image inputted to the terminal and its relating information; including the steps of: (a) specifying the visual field of the terminal corresponding to the inputted image by referring to at least one piece of information on a location, a displacement and a viewing angle of the terminal; and (b) acquiring a graphic element corresponding to the object, included in the visual field of the terminal, whose identity is recognized by using a technology for matching a building image and displaying the acquired graphic element with the inputted image in the form of the augmented reality by providing the graphic element on a location of the object displayed on a screen of the terminal.

In accordance with another aspect of the present invention, there is provided a method for providing information on an object included in a visual field of a terminal in a form of augmented reality (AR) by using an image inputted to the terminal and its relating information, including the steps of: (a) specifying the visual field of the terminal corresponding to the inputted image by referring to at least one piece of information on a location, a displacement and a viewing angle of the terminal; and (b) displaying graphic elements, respectively, corresponding to a first object which is included in the visual field of the terminal and is displayed on a screen thereof and a second object which is included in the visual field thereof and is not displayed on the screen thereof, with the inputted image in the form of the augmented reality differentially at a location of the first object, wherein the second object is not displayed on the screen by being hidden by the first object.

In accordance with still another aspect of the present invention, there is provided a terminal for providing information on an object included in a visual field thereof in a form of augmented reality (AR) by using an image inputted thereto and information related thereto, including: a location and displacement measuring part for specifying the visual field thereof corresponding to the inputted image by referring to at least one piece of information on a location, a displacement and a viewing angle thereof; an information searching part for recognizing the object included in the visual field thereof, if being inputted as a query, by using a technology for matching a building image and acquiring a graphic element corresponding to the recognized object; and a user interface part for displaying, with the inputted image, the acquired graphic element, which is provided on a location of the object displayed on a screen thereof, in the form of the augmented reality.

In accordance with still another aspect of the present invention, there is provided a terminal for providing information on an object included in a visual field thereof in a form of augmented reality (AR) by using an image inputted thereto and information related thereto, including: a location and displacement measuring part for specifying the visual field thereof corresponding to the inputted image by referring to at least one piece of information on a location, a displacement and a viewing angle thereof; and a user interface part for displaying graphic elements, respectively, corresponding to a first object which is included in the visual field thereof and is displayed on a screen thereof and a second object which is included in the visual field thereof and is not displayed on the screen thereof, with the inputted image in the form of the augmented reality differentially at a location of the first object, wherein the second object is not displayed on the screen by being hidden by the first object.

BRIEF DESCRIPTION OF THE DRAWINGS

The above and other objects and features of the present invention will become apparent from the following description of preferred embodiments given in conjunction with the accompanying drawings, in which.

DETAILED DESCRIPTION OF THE PREFERRED EMBODIMENTS

Figure 1:
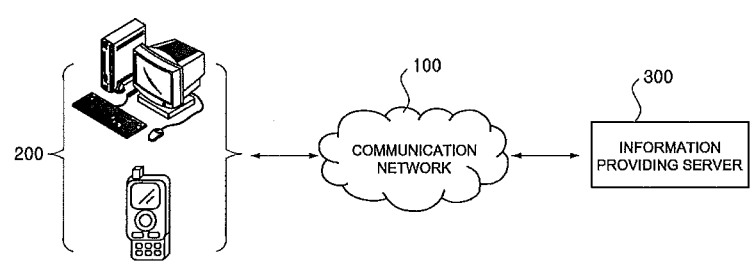
FIG. 1 is a diagram which briefly presents a configuration of an entire system to provide information on an object included in a visual field of a terminal in accordance with an example embodiment of the present invention.

The detailed description of the present invention illustrates particular embodiments in which the present invention can be performed with reference to the attached drawings.

In the following detailed description, reference is made to the accompanying drawings that show, by way of illustration, particular embodiments in which the invention may be practiced. These embodiments are described in sufficient detail to enable those skilled in the art to practice the invention. It is to be understood that the various embodiments of the invention, although different, are not necessarily mutually exclusive. For example, a certain feature, structure, or characteristic described herein in connection with one embodiment may be implemented within other embodiments without departing from the spirit and scope of the invention. In addition, it is to be understood that the location or arrangement of individual elements within each disclosed embodiment may be modified without departing from the spirit and scope of the invention. The following detailed description is, therefore, not to be taken in a limiting sense, and the scope of the present invention is defined only by the appended claims, appropriately interpreted, along with the full range of equivalents to which the claims are entitled. In the drawings, like numerals refer to the same or similar functionality throughout the several views.

The configurations of the present invention for accomplishing the objects of the present invention are as follows:

Configuration of Entire System

FIG. 1 briefly presents a configuration of an entire system for providing information on an object included in a visual field of a terminal in accordance with an example embodiment of the present invention.

As illustrated in FIG. 1, the entire system in accordance with an example embodiment of the present invention may include a communication network 100, a terminal 200, and an information providing server 300.

First, the communication network 100 in accordance with an example embodiment of the present invention may be configured, regardless of wired or wireless, in a variety of networks, including a telecommunication network, a local area network (LAN), a metropolitan area network (MAN), a wide area network (WAN), an artificial satellite network, etc. More preferably, the communication network 100 in the present invention must be understood to be a concept of networks including the World Wide Web (www), CDMA (Code Division Multiple Access), WCDMA (Wideband Code Division Multiple Access) or GSM (Global System for Mobile Communications).

Next, the terminal 200 in accordance with an example embodiment of the present invention may perform a function of providing graphic elements corresponding to an object included in a visual field of the terminal 200 at a location of the object displayed on a screen thereof in a form of augmented reality (AR) by using an image inputted through a photographing instrument, e.g., a camera, included in the terminal 200 and information related to the inputted image, i.e., the object. In accordance with the present invention, the terminal 200 may be a digital device which includes a function of allowing the user to access to, and then communicate with, the communication network 100. Herein, the digital device, such as a personal computer (e.g., desktop, laptop, tablet PC, etc.), a workstation, a PDA, a web pad, and a cellular phone, which has a memory means and a micro processor with a calculation ability, may be adopted as the terminal 200 in accordance with the present invention. An internal configuration of the terminal 200 will be explained later.

In accordance with an example embodiment of the present invention, the information providing server 300 may perform a function of providing various kinds of information at a request of the terminal 200 by communicating with the terminal 200 and another information providing server (non-illustrated) through the communication network 100. More specifically, the information providing server 300, which includes a web content search engine (non-illustrated), may search information corresponding to the request of the terminal 200 and provide the search result to allow a user of the terminal 200 to browse. For example, the information providing server 300 may be an operating server of an Internet search portal and the information provided for the terminal 200 may be various types of information on websites, web documents, knowledge, blogs, communities, images, videos, news, music, shopping, maps, books, movies, etc. Of course, the search engine, if necessary, may be included in a different computing device or a recording medium which does not relate to the information providing server 300.

Configuration of Terminal

Below is an explanation on an internal configuration and components of the terminal 200 which perform their important functions for implementing the present invention.

Figure 2:
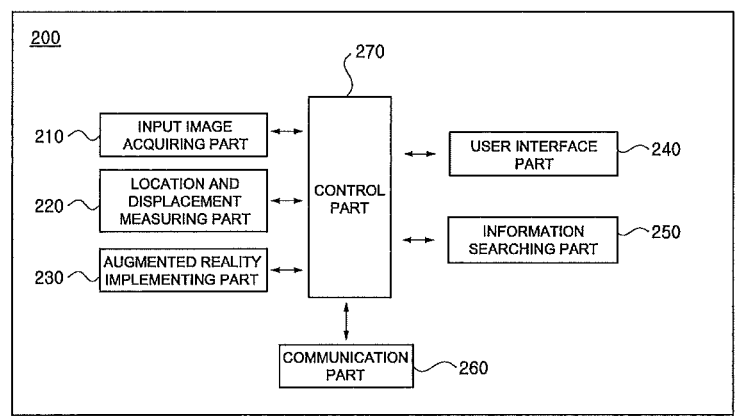
FIG. 2 is a diagram which exemplarily shows an internal configuration of a terminal 200 in accordance with an example embodiment of the present invention.

FIG. 2 exemplarily represents the internal configuration of the terminal 200 in accordance with an example embodiment of the present invention.

By referring to FIG. 2, the terminal 200 in accordance with an example embodiment of the present invention may include an input image acquiring part 210, a location and displacement measuring part 220, an augmented reality implementing part 230, a user interface part 240, an information searching part 250, a communication part 260 and a control part 270. In accordance with an example embodiment of the present invention, at least some of the input image acquiring part 210, the location and displacement measuring part 220, the augmented reality implementing part 230, the user interface part 240, the information searching part 250, the communication part 260 and the control part 270 may be program modules communicating with the user terminal 200. The program modules may be included in the terminal 200 in a form of an operating system, an application program module and other program modules and may also be stored on several memory devices physically. Furthermore, the program modules may be stored on remote memory devices communicable to the terminal 200. The program modules may include but not be subject to a routine, a subroutine, a program, an object, a component, and a data structure for executing a specific operation or a type of specific abstract data that will be described in accordance with the present invention.

First, the input image acquiring part 210 in accordance with an example embodiment of the present invention may perform a function of acquiring an inputted image serving as a basis of augmented reality implemented by the augmented reality implementing part 230, which will be explained later. More specifically, the input image acquiring part 210 in accordance with an example embodiment of the present invention may include a photographing instrument such as a CCD camera and conduct a function of receiving landscape appearance around a user, who holds the terminal 200, in real time in a preview state.

To determine to which region of the real world the inputted image acquired by the terminal 200 corresponds, the location and displacement measuring part 220 in accordance with an example embodiment of the present invention may carry out a function of measuring a location and a displacement of the terminal 200.

More precisely, the location and displacement measuring part 220 in accordance with an example embodiment of the present invention may measure the location of the terminal 200 by using technologies for acquiring location information such as a GPS (Global Positioning System) technology or a mobile communications technology. For example, the location and displacement measuring part 220 may include a GPS module or a mobile communications module. In addition, the location and displacement measuring part 220 in accordance with an example embodiment of the present invention may measure the displacement of the terminal 200 by using sensing means. For instance, the location and displacement measuring part 220 may include an accelerometer for sensing a moving distance, a velocity, an acceleration, a direction, etc. of the terminal 200 and a gyroscope for sensing a rotation rate, an angular velocity, an angular acceleration, a direction, etc. of the terminal 200.

In addition, the location and displacement measuring part 220 in accordance with an example embodiment of the present invention may perform a function of specifying the visual field of the terminal 200 corresponding to the image inputted therethrough, i.e., the visual field of the terminal 200 whose the location is determined to be a visual point, by referring to information on the location, the displacement, and the viewing angle of the terminal 200 measured as shown above.

More specifically, the visual field of the terminal 200 in accordance with an example embodiment of the present invention means a three-dimensional region in the real world and it may be specified as a viewing frustum whose vertex corresponds to the terminal 200, i.e., the visual point. Herein, the viewing frustum indicates the three-dimensional region included in a visual field of a photographing instrument, such as a camera, if an image is taken by the photographing instrument or inputted in a preview state therethrough. It may be defined as an infinite region in a shape of a cone or a polypyramid according to types of photographing lenses (or as a finite region in a shape of a trapezoidal cylinder or a trapezoidal polyhedron created by cutting the cone or the polypyramid by a near plane or a far plane which is vertical to a visual direction, i.e., a direction of a center of the lens embedded in the terminal 200 facing the real world which is taken by the lens thereof, the near plane being nearer to the visual point than the far plane) whose center serves as the visual point. With respect to the viewing frustum, the specification of Korean Patent Application No. 2010-0002340 filed by the applicant of the present invention may be referred to. The specification must be considered to have been combined herein.

Furthermore, the augmented reality implementing part 230 in accordance with an example embodiment of the present invention may perform a function of implementing augmented reality by combining the inputted image acquired by the terminal 200 and the information relating to the inputted image to thereby generate an output image visually expressed in a form of the augmented reality. For instance, the augmented reality implementing part 230 in accordance with an example embodiment of the present invention may display a graphic element, indicating a point of interest (POI) with respect to an object (e.g., a building, a store, etc.) considered to be included in the visual field of the terminal 200, as the information relating to the inputted image and provide more detailed information on the object if the point of interest with respect to the object is selected by the user. For another example, the augmented reality implementing part 230 in accordance with an example embodiment of the present invention may implement the augmented reality by displaying the inputted image overlapped with a semitransparent two-dimensional map for displaying the location of the object around a place where the terminal 200 is located or with a semitransparent information window including information on the weather of the place of the terminal 200.

To implement the augmented reality by using the inputted image acquired by the terminal 200 and the information relating to the inputted image, the user interface part 240 in accordance with an example embodiment of the present invention, additionally, may perform a function of displaying the graphic element with respect to the object included in the visual field of the terminal 200 at a location of the object displayed on a screen thereof with the inputted image. Therefore, a process for searching the object included in the visual field of the terminal 200 and searching the graphic element corresponding to the object must be preceded by referring to the information on the visual field of the terminal 200 and the location of the object existing in the real world. This may be performed by the information searching part 250, which will be explained later.

Herein, the graphic element displayed in addition to the inputted image in accordance with an example embodiment of the present invention may include a brand, a logo, a pattern landmark, etc. of the object. However, it is made clear that the graphic element in accordance with the present invention is not limited only to those listed above and other items suggesting or guiding a name, a type, a nature, etc. of the object included in the visual field of the terminal 200 may be included in the graphic element in accordance with the present invention.

If a first object included in the visual field of the terminal 200 hides a second object also included therein and thereby the second object is not displayed on the screen of the terminal 200, the user interface part 240 in accordance with an example embodiment of the present invention may also perform a function of differentially displaying graphic elements corresponding to the first and the second object, respectively. For example, on assumption that graphic elements corresponding to a building A included in the visual field of the terminal 200 and a building B located on an extension of a straight line connecting the terminal 200 with the building A are provided, the building B cannot be displayed directly on the screen of the terminal 200 because the building B is hidden by the building A but a variety of examples including that a part of the graphic element corresponding to the building B may be displayed to be overlapped behind that corresponding to the building A or that the graphic elements corresponding to the building A and the building B, respectively, may be displayed to be in consecutive order by rolling them will be applied to reproduce the present invention.

Figure 3:
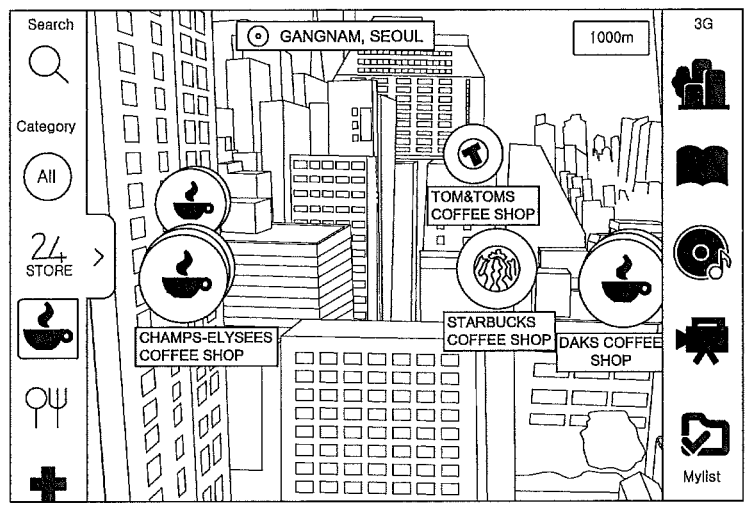
FIG. 3 is a drawing exemplarily illustrating graphic elements corresponding to the objects included in the visual field of the terminal in accordance with an example embodiment of the present invention.

FIG. 3 exemplarily illustrates a configuration of the graphic elements corresponding to the objects included in the visual field of the terminal in accordance with an example embodiment of the present invention.

By referring to FIG. 3, the configuration of allowing the graphic elements corresponding to the objects included in the visual field of the terminal 200 in accordance with an example embodiment of the present invention to be displayed in an output image in the form of augmented reality may be confirmed. More specifically, a brand emblem of a store called "Starbucks" located slightly on the right side of the center of the screen based on the visual field of the terminal 200 as a graphic element corresponding to the store "Starbucks" is displayed and a brand emblem of a store "Tom & Toms" located behind "Starbucks" based on the visual field of the terminal 200 as a graphic element corresponding to the store "Tom & Toms" is displayed.

In accordance with an example embodiment of the present invention, information on other images as well as the information on the output image implemented in the form of the augmented reality may be visually expressed through the display part (non-illustrated) of terminal 200. For example, the display part in accordance with an example embodiment of the present invention may be a flat-panel display including an LCD (Liquid Crystal Display) or an OLED (Organic Light Emitting Diodes).

Furthermore, the information searching part 250 in accordance with an example embodiment of the present invention may conduct a function of recognizing an object included in the visual field of the terminal 200 by referring to information on the visual field thereof and information on the location of the object in the real world and then acquiring a graphic element corresponding to the recognized object.

In addition, the information searching part 250 in accordance with an example embodiment of the present invention may perform a function of recognizing the object existing in the visual field of the terminal 200 by referring to information on a latitude, a longitude, an altitude, etc. of the object existing in the real world and information on the field of view (i.e., a three-dimensional region specified as a viewing frustum whose vertex is a visual point of the terminal 200) acquired from a location, a displacement, a viewing angle, etc. of the terminal 200.

If a building image including walls of at least one or more buildings, etc. in the visual field of the terminal 200 is inputted as a query through the user interface part 240, the information search part 250 in accordance with another example embodiment of the present invention may search an appropriate building matched with that included in the inputted query by using a technology for matching the building image, recognize the building included in the inputted query by referring to the searched one and acquire a graphic element stored on a database corresponding to the building included in the inputted query. As the technology for matching the building image, the specification of Korean Patent Application No. 2009-0087794 filed by the applicant of the present invention may be referred to. The specification must be considered to have been combined herein.

The method for recognizing the object included in the visual field of the terminal 200 has been described as shown above but it is not limited only to the aforementioned example embodiments and it will be able to reproduce the present invention by applying various examples.

In accordance with an example embodiment of the present invention, the information searching part 250 may perform a function of searching required information by communicating with the information providing server 300 to provide information requested from the terminal 200. For instance, supposing that information on a store A is requested from the terminal 200, the information searching part 250 in accordance with an example embodiment of the present invention may also search information on a location, a telephone number, vendor products, reviews, etc. of the store A by accessing a server of an information searching portal and allow at least some of the searched information to be provided for the terminal 200.

Moreover, the communication part 260 in accordance with an example embodiment of the present invention may perform a function of allowing the terminal 200 to communicate with an external device such as the information providing server 300.

Lastly, the control part 270 in accordance with an example embodiment of the present invention may control the flow of the data among the input image acquiring part 210, the location and displacement measuring part 220, the augmented reality implementing part 230, the user interface part 240, the information searching part 250 and the communication part 260. In other words, the control part 270 may control the flow of data from outside or among the components of the terminal 200 to thereby force the input image acquiring part 210, the location and displacement measuring part 220, the augmented reality implementing part 230, the user interface part 240, the information searching part 250 and the communication part 260 to perform their unique functions.

In accordance with the present invention, it is possible to provide the information on the graphic element corresponding to the object included in the visual field of the terminal on the location of the object displayed on the screen of the terminal and display it with the inputted image. Therefore, it may be able to allow the user to effectively recognize the object included in the visual field of the terminal and more accurately acquire its information on the object.

The embodiments of the present invention can be implemented in a form of executable program command through a variety of computer means recordable to computer readable media. The computer readable media may include solely or in combination, program commands, data files and data structures. The program commands recorded to the media may be components specially designed for the present invention or may be usable to a skilled person in a field of computer software. Computer readable record media include magnetic media such as hard disk, floppy disk, magnetic tape, optical media such as CD-ROM and DVD, magneto-optical media such as floptical disk and hardware devices such as ROM, RAM and flash memory specially designed to store and carry out programs. Program commands include not only a machine language code made by a complier but also a high level code that can be used by an interpreter etc., which is executed by a computer. The aforementioned hardware device can work as more than a software module to perform the action of the present invention and they can do the same in the opposite case.

While the invention has been shown and described with respect to the preferred embodiments, it will be understood by those skilled in the art that various changes and modification may be made without departing from the spirit and scope of the invention as defined in the following claims.

Accordingly, the thought of the present invention must not be confined to the explained embodiments, and the following patent claims as well as everything including variations equal or equivalent to the patent claims pertain to the category of the thought of the present invention.

What is claimed is:

1. A method for providing information objects included in a visual field of a terminal in a form of augmented reality (AR) by using an image inputted to the terminal and its relating information, comprising:

specifying the visual field of the terminal as a three dimensional region corresponding to the inputted image by referring to information on a location, a displacement and a viewing angle of the terminal; and acquiring graphic elements corresponding to the objects included in the visual field of the terminal, whose identities are recognized by using a technology for matching a building image and displaying the acquired graphic elements with the inputted image in the form of the augmented reality by providing the graphic elements on a location of the object displayed on a screen of the terminal, wherein displaying the graphic elements, respectively, corresponding to a first object which is included in the visual field of the terminal and is displayed on a screen thereof and a second object which is included in the visual field thereof and is not displayed on the screen by being hidden by the first object, wherein a part of a graphic element corresponding to the second object is displayed to be overlapped behind a graphic element corresponding to the first object, wherein the graphic element includes one of a brand, logo or pattern landmark associated with the object.

2. The method of claim 1, wherein the visual field is specified by a viewing frustum whose vertex corresponds to the terminal.

3. A non-transitory medium recording a computer readable program to execute the method of claim 1.

4. A terminal for providing information objects included in a visual field thereof in a form of augmented reality (AR) by using an image inputted thereto and information related thereto, comprising:

a processor executing:

a location and displacement measuring part for specifying the visual field as a three dimensional region corresponding to the inputted image by referring to information on a location, a displacement and a viewing angle thereof;

an information searching part for recognizing the object included in the visual field thereof, if being inputted as a query, whose identity is recognized by using a technology for matching a building image and acquiring graphic elements corresponding to the objects; and a user interface part for displaying, with the inputted image, the acquired graphic elements, which is provided on a location of the objects displayed on a screen thereof, in the form of the augmented reality, wherein displaying the graphic elements, respectively, corresponding to a first object which is included in the visual field of the terminal and is displayed on a screen thereof and a second object which is included in the visual field thereof and is not displayed on the screen by being hidden by the first object, wherein a part of a graphic element corresponding to the second object is displayed to be overlapped behind a graphic element corresponding to the first object, wherein the graphic element includes one of a brand, logo or pattern landmark associated with the object.

5. The terminal of claim 4, wherein the visual field is specified by a viewing frustum whose vertex corresponds thereto.

* * * * *